United States Patent
Ouyang (10) Patent No.: US 11,294,116 B2
(45) Date of Patent: Apr. 5, 2022

(54) DISPLAY DEVICE BASED ON DIFFUSION FILM AND ELECTRONIC DEVICE

(71) Applicant: GUANGDONG OPPO MOBILE TELECOMMUNICATIONS CORP., LTD., Guangdong (CN)

(72) Inventor: Zhibin Ouyang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 16/922,562

(22) Filed: Jul. 7, 2020

(65) Prior Publication Data

US 2020/0333526 A1    Oct. 22, 2020

Related U.S. Application Data

(63) Continuation of application No. PCT/CN2019/073892, filed on Jan. 30, 2019.

(30) Foreign Application Priority Data

Feb. 1, 2018  (CN) .......................... 201810110871.7
Feb. 1, 2018  (CN) .......................... 201820192784.6

(51) Int. Cl.
   *F21V 8/00*      (2006.01)
   *G02F 1/1335*    (2006.01)
   *G02F 1/13357*   (2006.01)

(52) U.S. Cl.
   CPC ......... *G02B 6/0051* (2013.01); *G02B 6/0055* (2013.01); *G02B 6/0088* (2013.01);
   (Continued)

(58) Field of Classification Search
   CPC combination set(s) only.
   See application file for complete search history.

(56) References Cited

U.S. PATENT DOCUMENTS

| | | | |
|---|---|---|---|
| 2003/0164913 A1* | 9/2003 | Ogawa ................. | G02B 6/0088 349/113 |
| 2013/0039029 A1* | 2/2013 | Wang ................... | G02B 6/0035 362/19 |

(Continued)

FOREIGN PATENT DOCUMENTS

| | | |
|---|---|---|
| CN | 202093200 | 12/2011 |
| CN | 205353526 | 6/2016 |

(Continued)

OTHER PUBLICATIONS

WIPO, ISR for PCT/CN2019/073892, Apr. 28, 2019.

(Continued)

*Primary Examiner* — Lauren Nguyen
(74) *Attorney, Agent, or Firm* — Hodgson Russ LLP (57) ABSTRACT

A display device and an electronic device are provided. The display device includes a backlight module and a display panel. The backlight module includes a light guide plate, a light source assembly, and a first diffusion film. The light guide plate has a first surface, a second surface disposed opposite to the first surface, and a side surface connected between the first surface and the second surface. The light source assembly is configured to emit light toward the side surface of the light guide plate. The first diffusion film is disposed on the second surface of the light guide plate and close to the light source assembly. The display panel is stacked on the first surface of the light guide plate, the display panel has a display region and a non-display region, and the first diffusion film is configured to diffuse incident light to the display region.

17 Claims, 7 Drawing Sheets

(52) U.S. Cl.
 CPC .. *G02F 1/133504* (2013.01); *G02F 1/133528* (2013.01); *G02F 1/133606* (2013.01); *G02F 1/133607* (2021.01)

(56) References Cited

U.S. PATENT DOCUMENTS

| | | | | |
|---|---|---|---|---|
| 2015/0070327 | A1* | 3/2015 | Hsieh | G06F 3/0421 345/175 |
| 2015/0261035 | A1 | 9/2015 | Bae et al. | |
| 2016/0363723 | A1* | 12/2016 | Choi | G02F 1/133308 |
| 2017/0293176 | A1* | 10/2017 | Bae | H01L 23/4985 |

FOREIGN PATENT DOCUMENTS

| | | |
|---|---|---|
| CN | 105867027 | 8/2016 |
| CN | 206096708 | 4/2017 |
| CN | 106970680 | 7/2017 |
| CN | 206818906 | 12/2017 |
| WO | 2014199676 | 12/2014 |

OTHER PUBLICATIONS

EPO, Extended European Search Report for EP Application No. 19746965.3, dated Feb. 9, 2021.
IPI, Office Action for IN Application No. 202017030028, dated Aug. 2, 2021.

\* cited by examiner

DISPLAY DEVICE BASED ON DIFFUSION FILM AND ELECTRONIC DEVICE

CROSS-REFERENCE TO RELATED APPLICATION(S)

This application is a continuation of International Patent Application No. PCT/CN2019/073892, filed Jan. 30, 2019, which claims priority to Chinese Patent Application No. 2018101108717, filed Feb. 1, 2018, and Chinese Patent Application No. CN 201820192784.6, filed Feb. 1, 2018. The entire disclosures of the above-identified patent applications are hereby incorporated by reference.

TECHNICAL FIELD

This disclosure relates to the technical field of electronic devices, and particularly to a display device and an electronic device.

BACKGROUND

In the related art, in order to realize a backlight function in electronic devices, a light source assembly for light-emitting is usually provided on one side of the electronic device, and then light is guided to a display region of the electronic device through a light guide plate to realize the backlight function. With the increase of display size of the electronic device, a brightness difference in the display region of the electronic device is obvious, which affects a overall display effect.

SUMMARY

Implementations provide a display device and an electronic device.

According to a first aspect, a display device is provided in implementations. The display device includes a backlight module and a display panel. The backlight module includes a light guide plate, a light source assembly, and a first diffusion film. The light guide plate has a first surface, a second surface disposed opposite to the first surface, and a side surface connected between the first surface and the second surface. The light source assembly is configured to emit light toward the side surface of the light guide plate. The first diffusion film is disposed on the second surface of the light guide plate and close to the light source assembly. The display panel is stacked on the first surface of the light guide plate, the display panel has a display region and a non-display region connected with the display region, the non-display region covers the light source assembly and the first diffusion film, and the first diffusion film is configured to diffuse incident light, which is emitted to the first diffusion film from the light source assembly, to the display region.

According to a second aspect, an electronic device is provided in implementations. The electronic device includes the display device according to the first aspect.

BRIEF DESCRIPTION OF THE DRAWINGS

To describe technical solutions in implementations of the present disclosure more clearly, the following briefly introduces accompanying drawings required for illustrating the implementations. Apparently, the accompanying drawings in the following description illustrate some implementations of the present disclosure. Those of ordinary skill in the art may also obtain other drawings based on these accompanying drawings without creative efforts.

DETAILED DESCRIPTION

Technical solutions in implementations of the present application will be clearly and completely described below with reference to the accompanying drawings.

In order to understand the above-mentioned objects, features, and advantages of the present application more clearly, the present application is described in detail below with reference to the accompanying drawings and specific implementations. It should be noted that, the implementations as well as features in the implementations can be combined with each other without conflicts.

In the following description, many specific details are set forth for a fully understanding of the present application. However, the described implementations are only a part rather than all of the implementations of the present application. Based on the implementations provided herein, all other implementations obtained by those of ordinary skill in the art without creative efforts shall fall within the protection scope of this application.

In addition, implementations of the present disclosure are described below with reference to the accompanying drawings for the purpose to illustrate specific implementations in which the present disclosure can be implemented. Directional terms used in the present disclosure, such as "width", "length", "X direction", "Y direction", "Z direction", etc., refer to directions in the accompanying drawings, therefore, theses directional terms are used for better describing and understanding of the present disclosure, rather than indicate or imply that a device or a component must have a specific orientation, be constructed or operated in a specific orientation, and should not be comprehended as limitations to the present disclosure. Unless otherwise specified, terms "dispose", "interconnect", "connect", and "fix" should be understood in a broad sense unless otherwise specified and limited. For example, terms "interconnect" and "connect" may refer to fixedly connect, detachably connect, or integrally connect. The terms "interconnect" and "connect" may also refer to mechanically connect, electrically connect, or communicate with each other. The terms "interconnect" and "connect" may also refer to directly connect, indirectly connect through an intermediate medium, intercommunicate interiors of two elements, or interact between two elements. For those of ordinary skill in the art, the specific meanings of the above terms in the implementations of the present disclosure can be understood according to specific situations.

Implementation I

Figure 1:
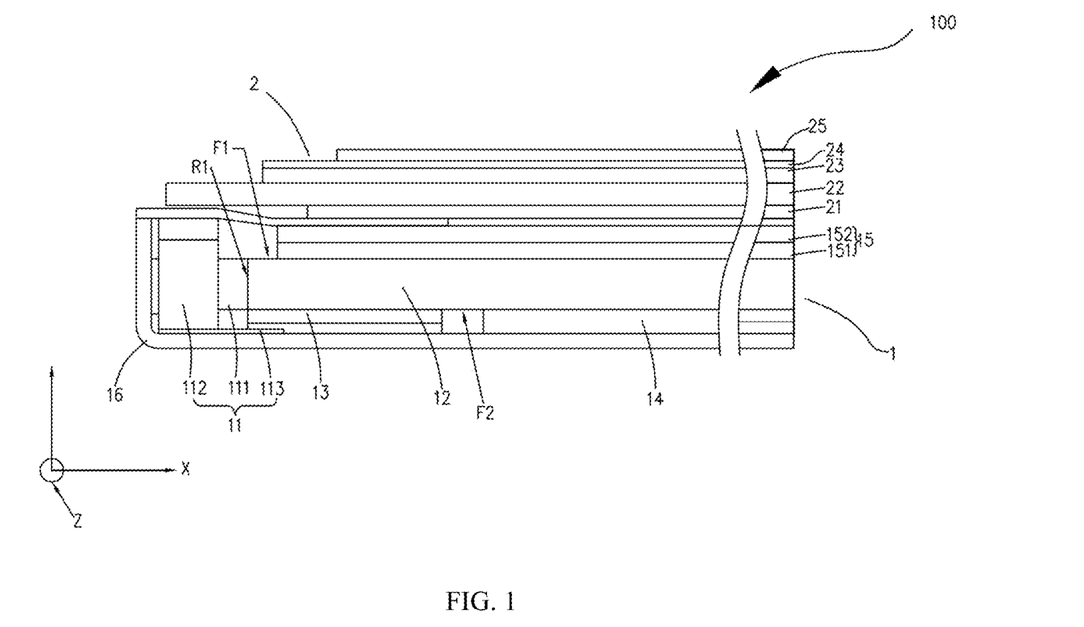
FIG. 1 is a schematic diagram illustrating a display device according to implementation I.

Implementation I provides a display device 100. As illustrated in FIG. 1, the display device 100 includes a display panel 2 and a backlight module 1. The backlight module 1 is disposed blow the display panel 2 and is configured to provide backlight for the display panel 2.

As illustrated in FIG. 1, the backlight module 1 includes a light guide plate 12, a light source assembly 11, and a first diffusion film 13. The light guide plate 12 has a first surface F1, a second surface F2 disposed opposite to the first surface F1, and a side surface R1 connected between the first surface F1 and the second surface F2. The light source assembly 11 is configured to emit lights toward the side surface R1 of the light guide plate 12. The first diffusion film 13 is disposed on the second surface F2 of the light guide plate 12 and close to the light source assembly 11, and the first diffusion film 13 is configured to diffuse incident lights, which is emitted to the first diffusion film 13 from the light source assembly 11, to a position of the first surface F1 away from the light source assembly 11.

For convenience of description, the length extension direction of the first surface F1 is defined as X direction, the direction from the first surface F1 to the second surface F2 is defined as Y direction, and the direction perpendicular to both the X direction and the Y direction is defined as Z direction.

In some implementations, as illustrated in FIG. 1, the light guide plate 12 is a transparent plate with a long rectangular shape. The light guide plate 12 is for light transmission. After lights emitted from the light source assembly 11 are incident through the side surface R1, part of the lights reaches the second surface F2. The lights reaching the second surface F2 can be reflected to the first surface F1 to form emitting lights of light source assembly 11. In other implementations, the light guide plate 12 can be in a thin cylindrical sheet shape or other shapes.

In some implementations, as illustrated in FIG. 1, the light source assembly 11 and the light guide plate 12 are arranged side by side along the X direction, and the light source assembly 11 is close to one side of the side surface R1 of the light guide plate 12. The lights emitted from the light source assembly 11 can be incident to the light guide plate 12 through the side surface R1. An area of the light guide plate 12 close to the light source assembly 11 has high brightness, and an area of the light guide plate 12 away from the light source assembly 11 has low brightness.

In some implementations, as illustrated in FIG. 1, the first diffusion film 13 is disposed on the second surface F2 of the light guide plate 12 and close to the light source assembly 11. The first diffusion film 13 has a fine-porous structure that can correct a diffusion angle of incident lights reaching the first diffusion film 13, that is, a light radiation area of lights incident on the first diffusion film 13 is increased, such that the lights incident on the first diffusion film 13 can be diffused to a position away from the light source assembly 11, which reduces brightness of an area of the light guide plate 12 close to the light source assembly 11 and increases brightness of an area of the light guide plate 12 away from the light source assembly 11. In other implementations, the first diffusion film 13 may also be composed of polarizers with different angles.

Figure 2:
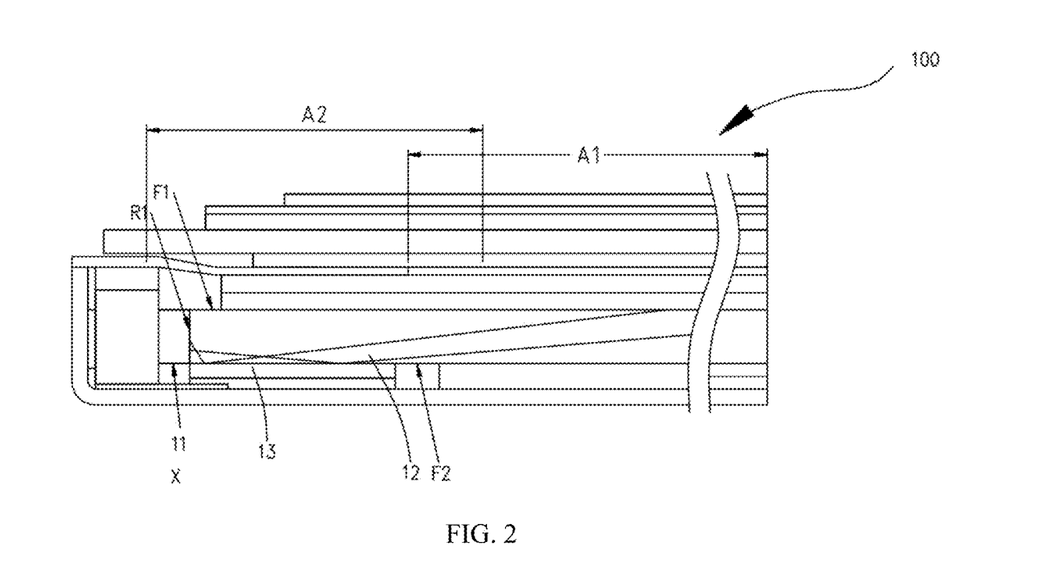
FIG. 2 is a schematic diagram illustrating lights in the display device illustrated in FIG. 1.

FIG. 2 is a schematic diagram illustrating lights in the backlight module 1 of the display device 100. As illustrated in FIG. 2, lights which are emitted from the light source assembly 11 reach the light guide plate 12 through the side surface R1 of the light guide plate 12, part of the lights will reach the second surface F2 and will be diffused by the first diffusion film 13 on the second surface F2 to a position of the first surface F1 away from the light source assembly 11.

Therefore, in implementations, the first diffusion film 13, which is close to the light source assembly 11, is disposed on the second surface F2 of the light guide plate 12, so that after lights emitted from the light source assembly 11 reach the first diffusion film 13, the first diffusion film 13 can diffuse the lights to a position of the first surface F1 away from the light source assembly 11. In this way, light intensity in a position of the first surface F1 away from the light source assembly 11 can be enhanced, and brightness in a position of the first surface F1 close to the light source assembly 11 and brightness in a position of the first surface F1 away from the light source assembly 11 ban be balanced, such that the backlight module 1 can emit lights uniformly.

As illustrated in FIG. 1, the second surface F2 partially overlaps the first diffusion film 13. In this implementation, the length of the first surface F1 in the X direction is greater than the length of the first diffusion film 13 in the X direction. The first diffusion film 13 is disposed on the light guide plate 12 in a position with strong light intensity to diffuse lights. The first surface F1 of the light guide plate 12 can also be correspondingly provided with other components (such as a reflector).

In some implementations, as illustrated in FIG. 1, a side of the first diffusion film 13 is flush with the side surface R1 of the light guide plate 12, so that the first diffusion film 13 can diffuse lights incident at a joint between the first surface F1 and the side surface R1, which can further improve reliability of the backlight module 1. In other implementations, in the X direction, the side of the first diffusion film 13 can be separated from the side surface R1 of the light guide plate 12 by a gap.

As illustrated in FIG. 1, the backlight module 1 can further include a reflective plate 14. The reflective plate 14 is disposed on the second surface F2 and arranged side by side with the first diffusion film 13. The reflective plate 14 is configured to diffuse incident lights, which is emitted to the reflective plate 14, to the first surface F1 at a certain reflection angle (e.g. angle of reflection).

Figure 3:
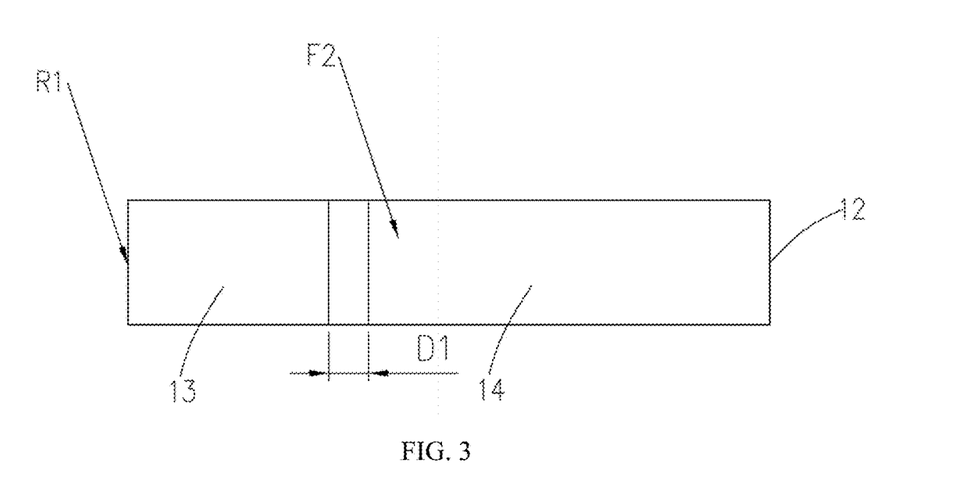
FIG. 3 is a schematic diagram illustrating a position of the first diffusion layer relative to the reflective plate illustrated in FIG. 1.

In some implementation, as illustrated in FIG. 1 and FIG. 3, the reflective plate 14 is away from the light source assembly 11 than the first diffusion film 13. The first diffusion film 13 and the reflective plate 14 are sequentially arranged on the second surface F2 of the light guide plate 12 along the X direction of the light guide plate 12. The size of the first diffusion film 13 in the Z direction is the same as the size of the second surface F2 in the Z direction. Lights which are close to the light source assembly 11 first reach the first diffusion film 13 and then are diffused by the first diffusion film 13. Lights which are away from the light source assembly 11 reach the reflective plate 14 and then are reflected by the reflective plate 14 to the first surface F1 at a certain angle of reflection. In other implementations, the reflective plate 14 can be arranged side by side with the first diffusion film 13 along the Z direction, and the length of the reflective plate 14 in the X direction is the same as the length of the second surface F2 in the X direction, thus part of lights close to the light source assembly 11 can be diffused by the first diffusion film 13 and part of the lights can be reflected by the reflective plate 14.

As illustrated in FIG. 3, the reflective plate 14 is separated from the first diffusion film 13 by a predetermined distance D1. The reflective plate 14 and the first diffusion film 13 are spaced by a preset distance along the X direction to form a gap, which is reserved for assembly of other components such as a support frame, the first diffusion film 13, the reflective plate 14, and the light guide plate 12. As such, interference between the first diffusion film 13 and the reflective plate 14 during installation can be prevented, and reliability of the backlight module 1 cab be improved. In other implementations, the reflective plate 14 and the first diffusion film 13 are connected to form a structure with the same size as the second surface F2. That is, there is no gap between the reflective plate 14 and the first diffusion film 13, and a structure formed by the reflective plate 14 and the first diffusion film 13 covers the second surface F2 completely.

As illustrated in FIG. 1, the light source assembly 11 is in close contact with the side surface R1 of the light guide plate 12, so that lights emitted from the light source assembly 11 can directly be incident into the light guide plate 12 from the side surface R1 to better guarantee a light-transmission path. In other implementations, the light source assembly 11 can be separated from the side surface R1 of the light guide plate 12 by a distance, for example, 2 millimeter (mm).

As illustrated in FIG. 1, the backlight module 1 further includes at least one antireflection film 15. The antireflection film 15 is disposed on the first surface F1 of the light guide plate 12, to improve light transmittance of the first surface F1 of the light guide plate 12. Specifically, the at least one antireflection film 15 includes a lower antireflection film 151 and an upper antireflection film 152. The lower antireflection film 151 and the upper antireflection film 152 are sequentially stacked on the first surface F1 of the light guide plate 12.

As illustrated in FIG. 1, the backlight module 1 further includes a support frame 16. The support frame 16 is disposed on a side of the second surface F2 of the light guide plate 12 to support the light source assembly 11, the light guide plate 12, and the reflective plate 14.

As illustrated in FIG. 1, the display panel 2 includes a lower polarizer 21, a thin film crystal array layer 22, a liquid crystal layer 23, a filter layer 24, and an upper polarizer 25 which are stacked in sequence. The lower polarizer 21 is attached to the first surface F1 of the light guide plate 12. The thin film crystal array layer 22 is provided with a encapsulation portion protruding from the lower polarizer 21, and the encapsulation portion forms the non-display region A2. Specifically, the display panel 2 is a liquid crystal display panel 2. The display panel 2 includes the lower polarizer 21, a thin film transistor (TFT) array layer 22, the liquid crystal layer 23, a color filter 24, and the upper polarizer 25, which are sequentially stacked on the antireflection film 15 of the backlight module 1.

Therefore, after lights emitted from the light source assembly 11 of the backlight module 1 are incident on the display panel 2 through the second surface F2 of the light guide plate 12 and the antireflection film 15, the lights pass through corresponding conducting liquid crystal molecules in the lower polarizer 21 and the liquid crystal layer 23, and then are filtered by the color filter 24 to form color lights, thereby forming a corresponding color display.

As illustrated in 2, the display panel 2 includes a display region A1 and a non-display region A2. The display panel 2 is approximately located in the display region A1 of the display panel 2. The light source assembly 11 is disposed in the non-display region A2 of the display panel 2. The display region A1 is away from the light source assembly 11 than the non-display region A2, that is, the non-display region A2 is close to the light source assembly 11. Correspondingly, the first diffusion film 13 is disposed in the non-display region A2 to diffuse lights in the non-display region A2 into the display region A1. The reflective plate 14 is disposed in the display region A1.

In some implementations, as illustrated in FIG. 1, the light source assembly 11 includes a light emitting element 111, a printed circuit board (PCB) 112, and a flexible printed circuit (FPC) 113. The light emitting element 111 is disposed on the PCB 112, and the PCB 112 is electrically connected with the FPC 113.

The PCB 112 is configured to support the light emitting element 111 and supply power for the light emitting element 111. A surface of the PCB 112 for connection with the light emitting element 111 faces the side surface R1 of the light guide plate 12.

In some implementations, as illustrated in FIG. 1, the light emitting element 111 can be a light emitting chip embedded in the PCB 112, thereby effectively reducing the length of the light source assembly 11 along the X direction and the size of the non-display region A2 along the X direction. In other implementations, the light emitting element 111 can also be an LED soldered on the PCB 112.

As illustrated in FIG. 1, the FPC 113 is configured to establish a connection between the PCB 112 and other functional modules such as a main board, to realize controls such as power supply control of the light emitting element 111. The FPC 113 is partially stacked on the second surface F2 of the light guide plate 12, in other words, the FPC 113 partially extends to the second surface F2 of the light guide plate 12, that is, extends to an area of the second surface F2 of the light guide plate 12 where the first diffusion film 13 is provided. That is, the first diffusion film 13 is partially sandwiched between the FPC 113 and the second surface F2 of the light guide plate 12.

By arranging the FPC 113 on the second surface F2 under the light guide plate 12, the influence on the lights emitted from the light guide plate 12 when the FPC 113 is disposed on the first surface F1 above the light guide plate 12 can be avoided, the structure of the backlight module 1 is optimized, and the reliability of the backlight module 1 is further improved.

According to the display device 100 provided, the backlight module 1 is disposed below the display panel 2, and the first diffusion film 13, which is close to the light source assembly 11, is disposed on the second surface F2 of the light guide plate 12, so that after lights emitted from the light source assembly 11 reach the first diffusion film 13, the lights can be diffused by the first diffusion film 13 to a position of the first surface F1 away from the light source assembly 11. In this way, light intensity in a position of the first surface F1 away from the light source assembly 11 can be enhanced, and brightness in a positions of the first surface F1 which is close to the light source and brightness in a positions of the first surface F1 which is away from the light source can be balanced.

Implementation II

Figure 4:
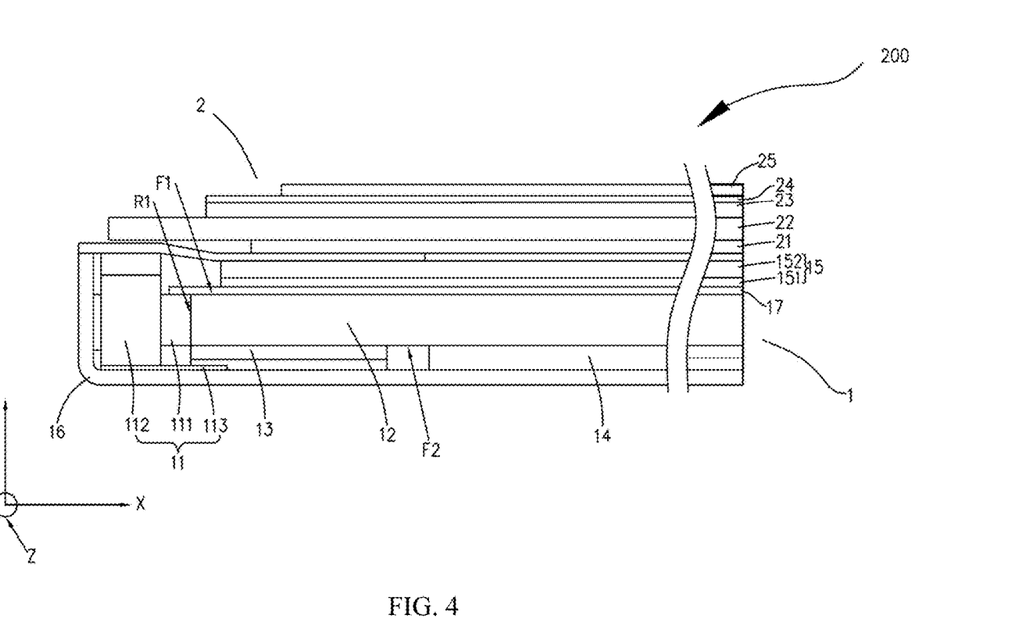
FIG. 4 is a schematic diagram illustrating a display device according to implementation II.

FIG. 4 is a schematic diagram illustrating a display device 200 according to implementation II. The display device 200 provided in implementation II is basically the same as the display device 100 provided in implementation 1 except that the backlight module 1 further includes a second diffusion film 17. The second diffusion film 17 is disposed on the first surface F1. An area of an orthographic projection of the second diffusion film 17 on the first surface F1 of the light guide plate 12 and an area of an orthographic projection of the FPC 113 on the first surface F1 of the light guide plate 12 are partially overlapped.

The second diffusion film 17 is configured to further diffuse lights emitted from the first surface F1, this makes the lights reaching the display panel 2 more uniform.

In this implementation, the second diffusion film 17 is disposed between the antireflection film 15 and the first surface F1 of the light guide plate 12. The area of the orthographic projection of the second diffusion film 17 on the first surface F1 of the light guide plate 12 and the area of the orthographic projection of the FPC 113 on the first surface F1 of the light guide plate 12 are partially overlapped, that is, the second diffusion film 17 and the FPC 113 are partially overlapped along the X direction. Compared with the situation where the second diffusion film 17 and the FPC 113 are arranged side-by-side along the X direction, here, the size is reduced and the structure of the display device 200 is optimized. The lights emitted from the light source assembly 11 reach the light guide plate 12 through the side surface R1 of the light guide plate 12. Part of the lights will reach the second surface F2 to be diffused by the first diffusion film 13 on the second surface F2 to a position of the first surface F1 away from the light source assembly 11. The lights reaching the second diffusion film 17 will be further diffused to form an area light source.

In some implementations, as illustrated in FIG. 4, the second diffusion film 17 completely covers the second surface F2, and part of the second diffusion film 17 close to the light source assembly 11 extends to be supported by the light source assembly 11. In other implementations, as illustrated in FIG. 4, the second diffusion film 17 partially covers the second surface F2, and part of the second diffusion film 17 close to the light source assembly 11 extends to be supported by the light source assembly 11.

Implementation III

Figure 5:
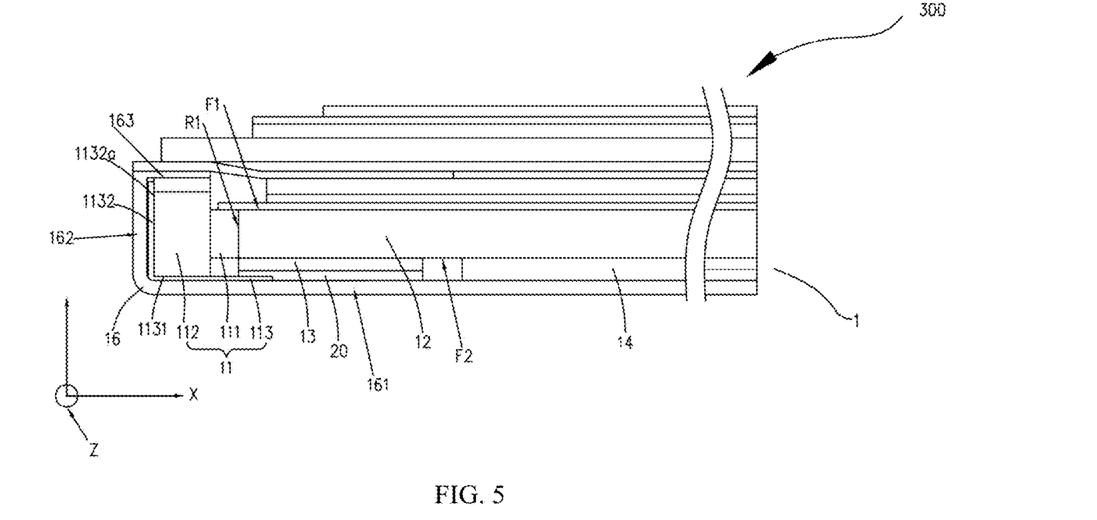
FIG. 5 is a schematic diagram illustrating a display device according to implementation III.

FIG. 5 is a schematic diagram illustrating a display device 300 according to implementation III. The display device 300 provided in implementation III is basically the same as the display device 200 provided in implementation 2 except that the structure of the FPC 113. The FPC 113 has a first connecting portion 1131 and a second connecting portion 1132 connected with (e.g. bent and extended from) the first connecting portion 1131. The first connecting portion 1131 is partially stacked with the second surface F2 of the light guide plate 12, the second connecting portion 1132 extends away from the second surface F2 of the light guide plate 12, and the second connecting portion 1132 is attached to the PCB 112.

In this implementation, as illustrated FIG. 5, the FPC 113 is bent into an "L" shape. The first connecting portion 1131 supports the PCB 112 and the light emitting element 111. The first connecting portion 1131 extends toward the light guide plate 12 and is partially attached to the second surface F2 of the light guide plate 12. The first diffusion film 13 is disposed between the second surface F2 of the light guide plate 12 and the first connecting portion 1131 of the FPC 113. The second connecting portion 1132 is provided with a pad 1132a electrically connected with the PCB 112. The pad 1132a covers the PCB 112. The width at which the pad 1132a protrudes from the PCB 112 is greater than the thickness of the first connecting portion 1131, so that an area in which the backlight module 1 is unable to provide backlight is reduced in a direction parallel to the first surface F1, and an proportion of light-transmitting area in which the backlight module 1 can provide backlight is increased.

The backlight module 1 in implementation 1, implementation 2, and implementation 3 may further include a support frame 16. The support frame 16 is configured to support the light source assembly 11, the light guide plate 12, and the reflective plate 14. The support frame 16 includes a first plate 161 which is stacked on the light guide plate 12 and close to the first surface F1. The support frame 16 further includes a second plate 162 extended from (e.g. bent and extending from) the first plate 161, and a third plate 163 extended from (e.g. bent and extending from) the second plate 162. The second plate 162 is close to the light source assembly 11. The third plate 163 is opposite to the first plate 161 and covers the light source assembly 11.

Figure 6:
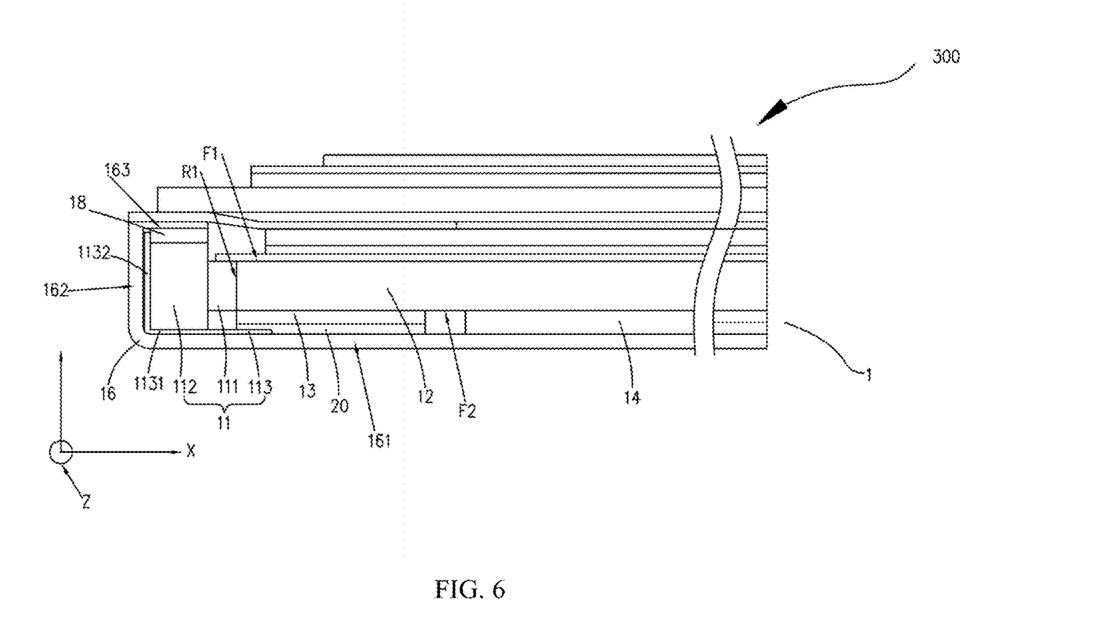
FIG. 6 is a schematic diagram illustrating a support frame illustrated in FIG. 5 according to implementations.

In some implementations, as illustrated in FIG. 6, the first plate 161 completely covers the light source assembly 11 and the light guide plate 12. The first plate 161 can be bonded to the first diffusion film 13 of the light guide plate 12 through an adhesive layer 20. The first plate 161 is bonded to the PCB 112 of the light source assembly 11. The first plate 161 can be bonded to an area of the PCB 112 that is not covered by the FPC 113 though a double-sided tape. In other words, the double-sided tape can be arranged side by side with the FPC 113. The double-sided tape is configured to secure the first plate 161 and the light source assembly 11 to make sure that linearity of arrangement of the light source assembly 11 on the side surface R1 is reduced and backlight effect is improved. The third plate 163 is provided with foam glue 18 for bonding the light source assembly 11. The foam glue 18 is bonded to the PCB 112 of the light source assembly 11 to achieve stability of the third plate 163 and the light source assembly 11. In other implementations, the support frame 16 may include at least one of the first plate 161 and the second plate 162. Specifically, in some implementations, the support frame 16 includes the first plate 161 which is stacked on the light guide plate 12 and close to the first surface F1, and the first diffusion film 13 is bonded to the support frame 16 through the adhesive layer 20. In some implementations, the support frame 16 further includes the second plate 162, which extends from (e.g. bent and extending from) the first plate 161 and close to the light source assembly 11.

In some implementations, the second plate 162 is bonded to the light source assembly 11. The second plate 162 is bonded to the PCB 112 via a double-sided tape. The second plate 162 is bonded to an area which is not covered by the second connecting portion 1132 of the FPC 113. In other words, the double-sided tape can be arranged side by side with the second connecting portion 1132 of the FPC 113. The double-sided shape is configured to secure the second plate 162 and the light source assembly 11 to make sure that linearity of arrangement of the light source assembly 11 on the side surface R1 is reduced, and backlight effect is improved.

The first plate 161, the second plate 162, and the third plate 163 each have light-blocking performance. The first plate 161, the second plate 162, and the third plate 163 cover the light guide plate 12 and the light source assembly 11 to prevent light leakage of the backlight module 1. That is, the first plate 161, the second plate 162, and the third plate 163 form a protective case of the backlight module 1 to ensure safety of the backlight module 1.

Figure 7:
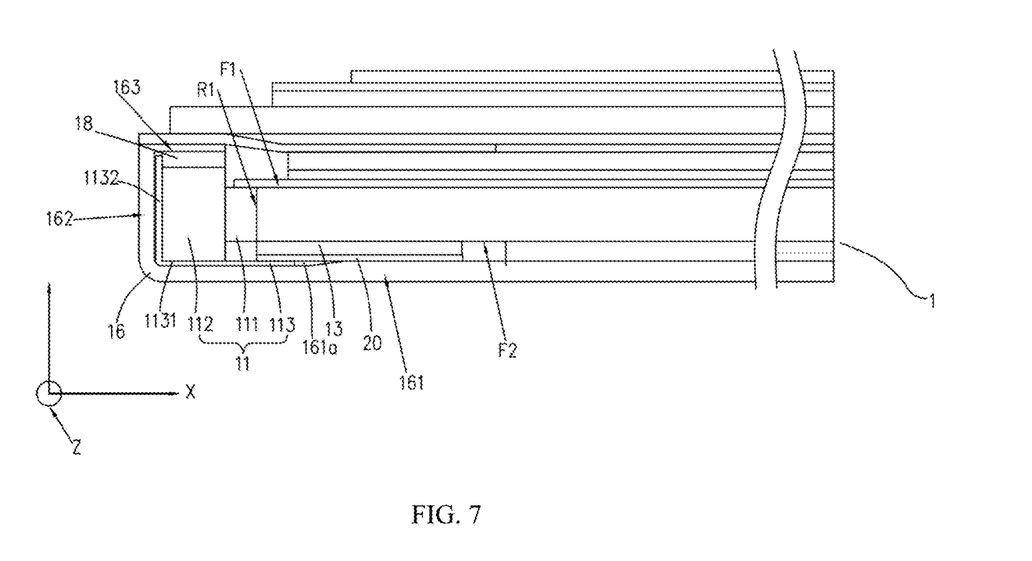
FIG. 7 is a schematic diagram illustrating the support frame illustrated in FIG. 5 according to other implementations.

In some implementations, as illustrated in FIG. 7, the first plate 161 defines a counter bore 161a on a side facing the light source assembly 11. The counter bore 161a is directly opposite to the light source assembly 11. The counter bore 161a is also directly opposite to the FPC 113. The first plate 161 forms a protrusion on a side away from the light source assembly 11, so that part of the light source assembly 11 and part of the FPC 113 can be accommodated in the counter bore 161a. The first plate 161 defines the counter bore 161a, so as to reduce an area where the backlight module 1 is unable to provide backlight in a direction parallel to the first surface F1 and increase a proportion of the light-transmitting area where the backlight module 1 can provide backlight.

Figure 8:
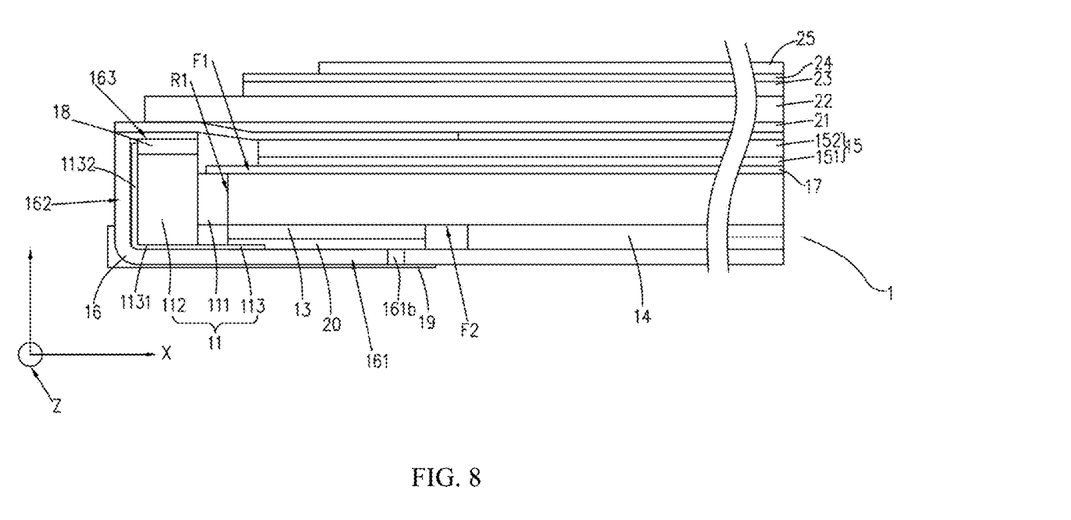
FIG. 8 is a schematic diagram illustrating the support frame illustrated in FIG. 5 according to other implementations.

In another implementations, as illustrated in FIG. 8, the first plate 161 defines a through-hole 161b, and the through-hole 161b is directly opposite to the light source assembly. The backlight module 1 further includes a light-shielding strip 19 and the light-shielding strip 19 covers the through-hole 161b. The through-hole 161b is also directly opposite to the FPC 113. The FPC 113 is bonded to the first diffusion film 13. The first plate 161 defines the through-hole 161b to facilitate assembly of the light source assembly 11, the FPC 113, and the light guide plate 12.

As illustrated in FIG. 8, first, a foam glue 18 is bonded to the third plate 163. Then the light source assembly 11 passes through the through-hole 161b and is bonded to the foam glue 18. The FPC 113 passes through the through-hole 161b along with the light source assembly 11 and is secured to the inside the first plate 161. Thereafter the first diffusion film 13 is attached to the second surface F2 of the light guide plate 12, a adhesive layer 20 is coated on the first diffusion film 13, and the light guide plate 12 provided with the first diffusion film 13 is secured to the inside the first plate 161. The second diffusion film 17 (if any), the lower antireflection film 151, and the upper antireflection film 152 are sequentially secured to the first surface F1 of the light guide plate 12. At last, the light-shielding strip 19 covers the through-hole 161b. The light-shielding strip 19 is partially stacked with the first plate 161 and partially stacked with the second plate 162, so as to increase firmness of the light-shielding strip 19 and prevent light leakage of the through-hole 161b.

Figure 9:
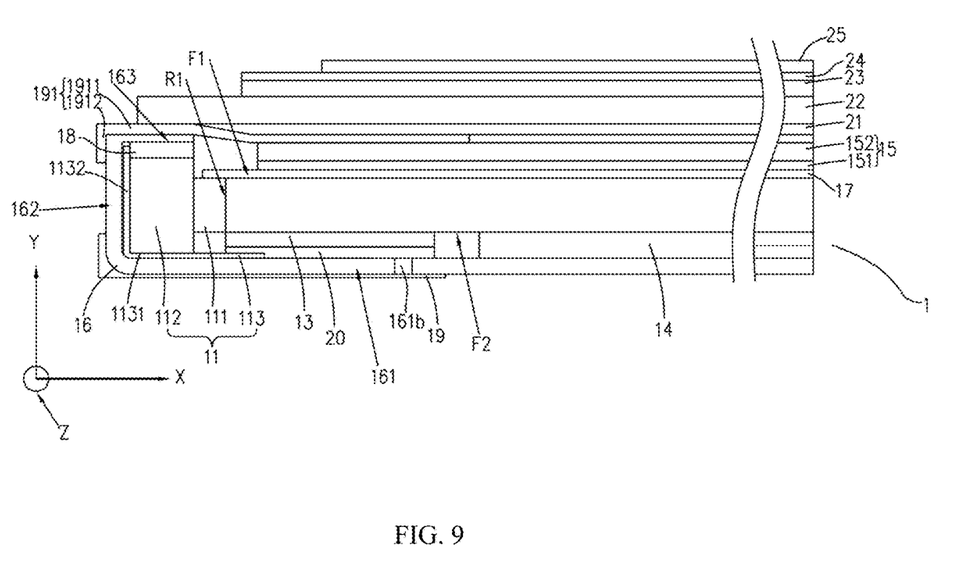
FIG. 9 is a schematic diagram illustrating the light-shielding glue illustrated in FIG. 5.

As illustrated in FIG. 9, the backlight module 1 further includes a light-shielding glue 191. The light-shielding glue 191 includes a first light-shielding layer 1911 and a second light-shielding layer 1912 extended from (e.g. bent and extending from) the first light-shielding layer 1911. The first light-shielding layer 1911 is stacked on a side of the third plate 163 away from the light source assembly 11 and covers at least the light source assembly 11. The second light-shielding layer 1912 covers the second plate 162.

In some implementations, as illustrated in FIG. 9, an area of an orthographic projection of the first light-shielding layer 1911 on the light guide plate 12 and an area of the diffusion film are overlapped. Lights emitted from the light source assembly 11 are unable to pass through the first light-shielding layer 1911, thereby realizing encapsulation of the backlight module 1 and preventing the light of the light source assembly 11 from leaking between the third plate 163 and the light guide plate 12. The light-shielding layer 1911 forms an area where the backlight module 1 is unable to provide backlight. The first light-shielding layer 1911 just covers an area where the first diffusion film 13 is located, so as to reduce the area where the backlight module 1 is unable to provide backlight. The second light-shielding layer 1912 covers the second plate 162, so as to increase a contact area between the light-shielding glue 191 and the support frame 16, and increase firmness of bonding between support frame 16 and external components.

Figure 10:
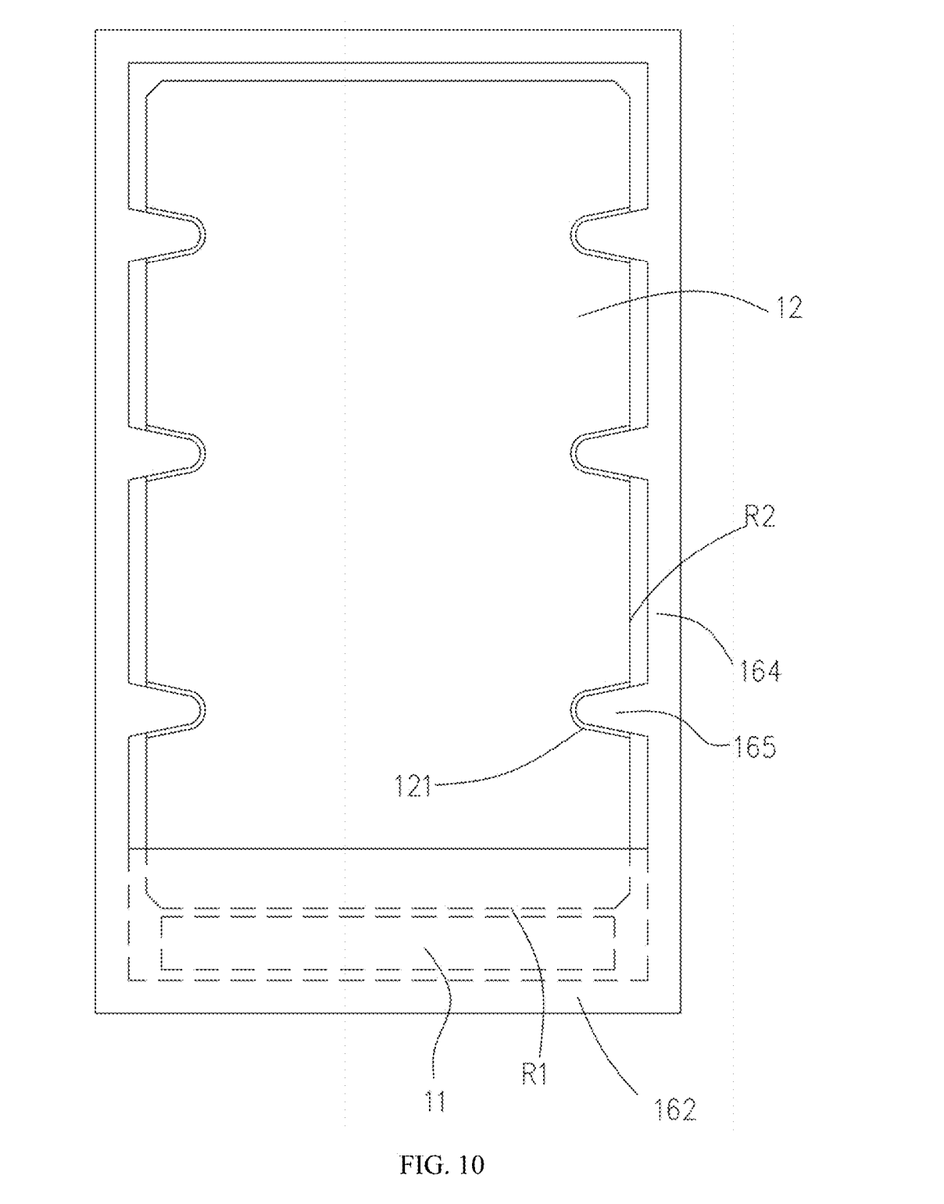
FIG. 10 is a schematic diagram illustrating the light guide plate and the support frame illustrated in FIG. 5.

As illustrated in FIG. 10, the light guide plate 12 further has a side surface R2 for light emitting. The side surface R2 for light emitting is connected between the first surface F1 and the second surface F2. The side surface R2 for light emitting is parallel to the side surface R1. The side surface R2 for light emitting is provided with a first positioning portion 121. The support frame 16 further includes a fourth plate 164 extended from (e.g. bent and extending from) the first plate 161. The fourth plate 164 is attached to the side surface R1. The fourth plate 164 is provided with a second positioning portion 165 matched with the first positioning portion 121.

In this implementation, the fourth plate 164 blocks the side surface R1 of the light guide plate 12 in the X direction to prevent light leakage. The side surface R1 is provided with multiple first positioning portions 121. The fourth plate 164 is correspondingly provided with multiple second positioning portions 165 matched with the multiple first positioning portions 121, to ensure a short distance between the light guide plate 12 and the support frame 16 and a high assembly precision of the light guide plate 12 and the support frame 16. The first positioning portion 121 can be a groove and the second positioning portion 165 can be a boss. In other implementations, the first positioning portion 121 can be a boss and the second positioning portion 165 can be a groove.

Figure 11:
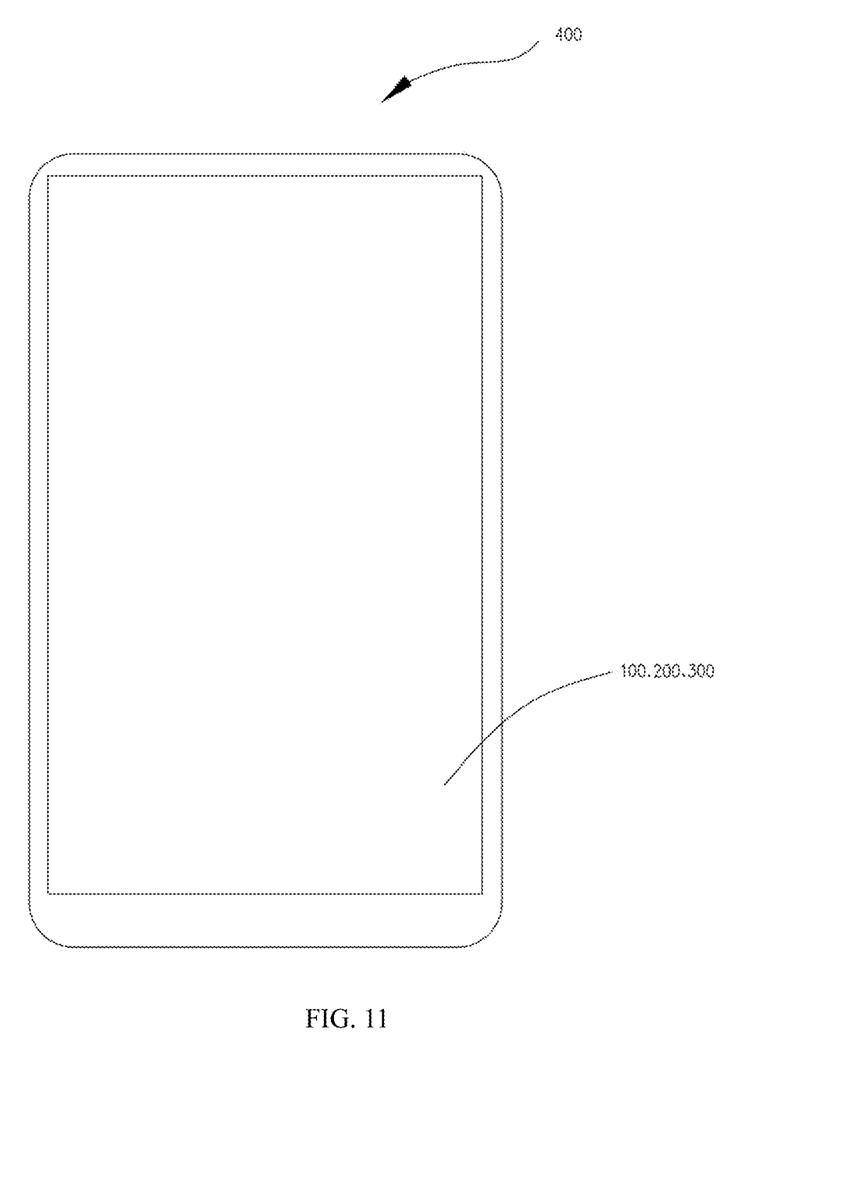
FIG. 11 is a schematic diagram illustrating an electronic device according to implementations.

FIG. 11 is a schematic diagram illustrating an electronic device 400 according to implementations. As illustrated in FIG. 11, the electronic device 400 includes any of the display device 100, display device 200, and display device 300 described in any one of the foregoing implementations.

The electronic device 400 may be an electronic product such as a display, a television, a mobile phone, a tablet computer and the like. The display device 100, display device 200, and display device 300 may be a structure including a backlight module and a display panel in the electronic device 400.

It should be noted that some implementations of the present disclosure may focus on introducing changes of only one or a few components, and other parts that are not introduced or not highlighted can also be applicable to these implementations when they have different variations in other implementations. For example, when the structure of the light source assembly 11 in FIGS. 1 and 7 changes, the first diffusion film 13 may adopt any of the structure in FIGS. 1, 4, 5, and 6.

Obviously, the electronic device 400 may further include other components, such as a processor, a memory, and so on, which are not related to the improvement of the present disclosure and not described herein.

While the disclosure has been described in connection with certain implementations, it is to be understood that the disclosure is not to be limited to the disclosed implementations but, on the contrary, is intended to cover various modifications and equivalent without departing from the principles of the disclosure.

What is claimed is:

1. A display device, comprising:
   a backlight module, comprising:
      a light guide plate having a first surface, a second surface disposed opposite to the first surface, and a side surface connected between the first surface and the second surface;
      a light source assembly, configured to emit light toward the side surface of the light guide plate;
      a first diffusion film, disposed on part of the second surface of the light guide plate and close to the light source assembly, wherein the light source assembly has a light-emitting side parallel with the side surface of the light guide plate and non-parallel to the second surface where the first diffusion film is disposed, wherein the light emitted from the light source assembly reaches the light guide plate through the side surface, part of the light reaches the second surface, and the first diffusion film on the second surface is configured to diffuse incident light, which is emitted to the first diffusion film from the light source assembly, to a position of the first surface away from the light source assembly; and a reflective plate disposed on the second surface and arranged side by side with the first diffusion film, wherein the reflective plate is further away from the light source assembly than the first diffusion film and the reflective plate is separated from the first diffusion film by a predetermined distance; and a display panel, stacked on the first surface of the light guide plate, wherein the display panel has a display region and a non-display region connected with the display region, the non-display region covers the light source assembly and the first diffusion film.

2. The display device of claim 1, wherein the second surface partially overlaps the first diffusion film.

3. The display device of claim 2, wherein a side of the first diffusion film is flush with the side surface of the light guide plate.

4. The display device of claim 1, wherein the light source assembly is in close contact with the side surface of the light guide plate.

5. The display device of claim 1, wherein the light source assembly comprises a light emitting element, a printed circuit board (PCB), and a flexible printed circuit (FPC), the light emitting element is disposed on the PCB, the PCB is electrically connected with the FPC, and the FPC is partially stacked with the second surface of the light guide plate.

6. The display device of claim 5, wherein the backlight module further comprises a second diffusion film disposed on the first surface, and an area of an orthographic projection of the second diffusion film on the first surface of the light guide plate and an area of an orthographic projection of the FPC on the first surface of the light guide plate are partially overlapped.

7. The display device of claim 5, wherein the FPC has a first connecting portion and a second connecting portion connected with the first connecting portion, the first connecting portion is partially stacked with the second surface of the light guide plate, the second connecting portion extends away from the second surface of the light guide plate, and the second connecting portion is attached to the PCB.

8. The display device of claim 1, wherein the backlight module further comprises a support frame, the support frame comprises a first plate which is stacked on the light guide plate and close to the first surface, and the first diffusion film is bonded to the support frame through an adhesive layer.

9. The display device of claim 8, wherein the support frame further comprises a second plate which is extended from the first plate and close to the light source assembly.

10. The display device of claim 9, wherein the first plate is bonded to the light source assembly, and the second plate is bonded to the light source assembly.

11. The display device of claim 9, wherein the support frame further comprises a third plate extended from the second plate, and the third plate is opposite to the first plate and covers the light source assembly.

12. The display device of claim 11, wherein the backlight module further comprises a light-shielding glue, the light-shielding glue comprises a first light-shielding layer and a second light-shielding layer extended from the first light-shielding layer, the first light-shielding layer is stacked on a side of the third plate away from the light source assembly and covers at least the light source assembly, and the second light-shielding layer covers the second plate.

13. The display device of claim 9, wherein the first plate defines a through-hole, the through-hole is directly opposite to the light source assembly, the backlight module further comprises a light-shielding strip, and the light-shielding strip covers the through-hole.

14. The display device of claim 9, wherein the first plate defines a counter bore on a side facing the light source assembly, and the counter bore is directly opposite to the light source assembly.

15. The display device of claim 9, wherein the light guide plate further has a side surface for light emitting, the side surface for light emitting is connected between the first surface and the second surface, the side surface for light emitting is provided with a first positioning portion, the support frame further comprises a fourth plate extended from the first plate, the fourth plate is attached to the side surface for light emitting and is provided with a second positioning portion which is matched with the first positioning portion.

16. The display device of claim 1, wherein the display panel comprises a lower polarizer, a thin film crystal array layer, a liquid crystal layer, a filter layer, and an upper polarizer which are stacked in sequence, the lower polarizer is attached to the first surface of the light guide plate.

17. An electronic device, comprising:
a display device, comprising:
a backlight module, comprising:
a light guide plate having a first surface, a second surface disposed opposite to the first surface, and a side surface connected between the first surface and the second surface;
a light source assembly, configured to emit light toward the side surface of the light guide plate;
a first diffusion film, disposed on part of the second surface of the light guide plate and close to the light source assembly, wherein the light source assembly has a light-emitting side parallel with the side surface of the light guide plate and non-parallel to the second surface where the first diffusion film is disposed, wherein the light emitted from the light source assembly reaches the light guide plate through the side surface, part of the light reaches the second surface, and the first diffusion film on the second surface is configured to diffuse incident light, which is emitted to the first diffusion film from the light source assembly, to a position of the first surface away from the light source assembly; and
a reflective plate disposed on the second surface and arranged side by side with the first diffusion film, wherein the reflective plate is further away from the light source assembly than the first diffusion film and the reflective plate is separated from the first diffusion film by a predetermined distance; and
a display panel, stacked on the first surface of the light guide plate, wherein the display panel has a display region and a non-display region connected with the display region, and the non-display region covers the light source assembly and the first diffusion film.

\* \* \* \* \*